United States Patent

Shimomura et al.

[11] Patent Number: 5,839,859
[45] Date of Patent: Nov. 24, 1998

[54] CUTTING TOOL MATING SURFACES HAVING A V-SHAPE CROSS-SECTION

[75] Inventors: Hiroshi Shimomura; Syoji Takiguchi, both of Gifu-ken, Japan

[73] Assignee: Mitsubishi Materials Corporation, Tokyo, Japan

[21] Appl. No.: 923,540

[22] Filed: Sep. 4, 1997

[30] Foreign Application Priority Data

Sep. 6, 1996 [JP] Japan ..................................... 8-257551

[51] Int. Cl.$^6$ ..................................................... B23B 51/00
[52] U.S. Cl. ........................... 408/158; 408/83.5; 408/147
[58] Field of Search ............................ 408/36, 83.5, 153, 408/158, 147, 161, 169, 172; 82/1.4

[56] References Cited

U.S. PATENT DOCUMENTS

| | | |
|---|---|---|
| 3,902,386 | 9/1975 | Dressler et al. ......................... 408/158 |
| 5,427,479 | 6/1995 | Ueda et al. . |
| 5,482,412 | 1/1996 | Ueda et al. . |
| 5,620,284 | 4/1997 | Ueda et al. . |

*Primary Examiner*—Daniel W. Howell
*Attorney, Agent, or Firm*—Oblon, Spivak, McClelland, Maier & Neustadt, P.C.

[57] ABSTRACT

A cutting tool has a slidable cutting-blade chip 5A, in which a slider 7 is slidably mounted into a groove 6 formed in the cutting tool main body 1, to offset a pressing force applied to the bottom face 6c of the groove 6 through the slider 7, to prevent abrasion of the slider 7 and the groove 6 and uneven abrasion of serration grooves 7a and 8a of the slider 7 and a spacer 8, and to suppress backlash of the slider 7. A spacer 9 is detachably disposed between one side face 6a of a groove 6 and a slider 7, a plate 22 is disposed between another side face of the slider 7 and another side face 6b of the groove 6 so as to press the plate 22 toward the side face 6a. A protruding section 21 and a dent section 24 each have a V-shape cross-section and are formed on another side face of the slider 7 and on one side face of the plate 22, respectively, wherein the protruding section 21 and the dent section can come into contact with each other.

5 Claims, 3 Drawing Sheets

CUTTING TOOL MATING SURFACES HAVING A V-SHAPE CROSS-SECTION

BACKGROUND OF THE INVENTION

1. Field of the Invention

The present invention relates to a cutting tool suitable for perforating cylinder heads of engines to form valve holes.

2. Discussion of the Related Art

The present inventors disclosed such a cutting tool in Japanese Patent Laid-Open No. 7-241710, as shown in FIGS. 2 to 5.

In these drawings, a cutting tool main body I having a conical shape is mounted to a spindle nose (not shown in the drawings) of a machine tool through an adaptor 2, and used for cutting by rotation along the axis O. At the tip of the cutting tool main body 1, a bush 3 is mounted along the axis O and a driller (not shown in the drawings) such as a gun reamer is fitted to the bush 3. The bush 3 can be moved along axis O by means of a spindle 4. The cutting tool main body 1 is provided with three cutting-blade chips 5A, 5B and 5C along the periphery of the tip of the main body. Two of these cutting-blade chips 5B and 5C are directly fixed to the cutting blade main body 1, and the other chip 5A is slidably attached along the surface of the cone shaped by the cutting tool main body 1.

For this purpose, a groove 6 is formed in the cutting tool main body 1 along the surface of the cone oblique to the axis O, as shown in FIG. 2. A slider 7 mounted in the groove 6 detachably holds the cutting-blade chip 5A. The groove 6 is formed with a pair of parallel side faces 6a and 6b and a bottom face 6c perpendicular to the side faces 6a and 6b. A spacer 8 is detachably attached to the upstream (in the rotation direction T) side face 6a of the groove 6 with clamp bolts 10. A wedge 9 is detachably attached to the downstream side face 6b with clamp bolts 11. The slider 7 is disposed between the spacer 8 and the wedge 9.

The spacer 8 is a fixed plate extending over the entire length of the groove 6 and in close contact with the side face 6a and the bottom face 6c. The downstream side wall of the spacer 8 is provided with serrations 8a as an engagement section extending along the generating line.

The fixed wedge 9 also extends over the entire length of the groove 6 with its downstream side face 9a in close contact with the side face 6b and its upstream side face 9b convergently sloping toward the bottom face 6c of the groove 6.

The slider 7 is a prismatic member having a bent end as shown in FIG. 2. Its base section is disposed in the groove 6 and the cutting tool chip 5A is detachably attached to the bent end.

The base section of the slider 7 is provided with a serration groove 7a, which meshes with the serration groove 8a of the spacer 8. Another side face 7b slopes in response to the slope of the side face 9b of the wedge 9. The wedge 9 is fixed with clamp bolts 11 via a compressed cone disc spring group 12 which presses the wedge 9 toward the bottom face 6c of the groove 6. Thus, the slider 7 is always pressed toward the spacer 8 so that the serration grooves 7a and 8a engage each other.

The cutting tool main body 1 and the adaptor 2 are provided with attaching holes 1a and 2a, respectively, on the axis O. A slider 13 and a coupler 14 are inserted into these holes 1a and 2a. The coupler 14 is fitted to the hole la via a key 14a such that the coupler 14 can rotate about the axis O in cooperation with the cutting tool main body 1 and can move along the hole 1a in cooperation with moving of the slider 13.

The groove 6 communicates with the attaching hole 1a via a through hole 6d, and a connecting pin 15 is attached to the through hole of the slider 7. The tip of the connecting pin 15 is inserted into an inclined hole 14b of the coupler 14 so as to connect the slider 7 with the coupler 14. The slider thus 7 slides along the groove 6 in cooperation with the movement of the coupler 14 so as to slide the cutting-blade chip 5A in a direction oblique to the axis O.

FIG. 5 shows a rotation locus along the axis O of cutting blade chips 5A, SB and 5C. Two cutting-blade chips 5B and 5C are provided such that cutting blades 5b and 5c are used for cutting across each other to form an obtuse angle at the rotation locus. The moving locus R. which indicates movement of the cutting blade 5a of the cutting-blade chip 5A due to sliding of the slider 7, forms an obtuse angle with cutting blades 5b and 5c of cutting-blade chips 5B and 5C. The symbol S in FIG. 5 indicates a hard material such as a sintered metal which is fitted to the periphery of the opening such as a valve hole.

In forming perforations for valves using such a cutting tool, a perforating tool is mounted onto the bush 3, is moved to a base position of the cutting tool main body 1 by the spindle 4, and is fed along the axis O while rotating the cutting tool main body 1 along the axis O so as to form chamfers C, C on the opening section of the hole with the two fixed cutting-blade chips 5B and 5C, as shown in FIG. 5.

After forming the chamfers C, C, the rotating cutting tool main body 1 is slightly moved back, and the slider 13 is pressed to move the coupler 14 forward. Thereby, the slider 7 slides via the connecting pin 15 so that the cutting-blade chip 5A moves along the moving locus R to form a taper face P at the opening section of the hole. While rotating the cutting tool main body 1, the perforating tool is moved with the spindle 4 into the interior of the valve hole for a finishing operation.

In a cutting tool having such a configuration, a cutting load applied to the cutting blade chip 5A is primarily borne by the spacer 8 through the slider 7, and the spacer 8 and the wedge 9 wear due to the sliding of the slider 7. Thus, the cutting tool main body 1 is not damaged by a cutting load or sliding of the slider 7, resulting in economic advantages. Further, a worn or damaged spacer 8 and the wedge 9 can be easily and rapidly exchanged, and thus high accuracy cutting can be maintained.

In addition, the wedge 9 is pressed toward the bottom face of the groove 6 by the cone disc spring group 12, and the slider 7 is also pressed toward the spacer 8. Thus, backlash of the slider 7 can be suppressed even when the serration grooves 7a and 7b are slightly worn.

However, the side face 9b of the wedge 9, which slopes toward the side face 6b at the bottom face 6c of the groove 6, presses the other side face 7b of the slider 7 because the cone disc spring group 12 presses the wedge 9 toward the bottom face 6c. Thus, the slider 7 is pressed toward the spacer 8 and is unavoidably affected by a pressing force toward the spacer 8 and a pressing force toward the bottom face 6c of the groove 6. The latter pressing force will cause abrasion at the bottom face 7c of the slider 7 and the bottom face 6c of the groove 6. Faces of the serration groove 7a which face the bottom face 6c, and faces of the serration groove 8a which face to the periphery of the cutting tool (the upper side in FIG. 3), will thus be rapidly worn compared to other faces.

SUMMARY OF THE INVENTION

It is an object of the present invention to provide a cutting tool having slidable cutting-blade chips, in which no pressing force toward the bottom face of the groove is applied to the slider, so that abrasion of the bottom face of the slider and the bottom face of the groove and uneven abrasion of the serration grooves can be prevented, and backlash of the slider can be more securely reduced.

In order to achieve the above-mentioned object, the present invention includes a cutting tool comprising a conical main body rotating along an axis and having a groove formed in a peripheral surface of the cone, a slider having a cutting-blade chip and slidably mounted in said groove, a spacer mounted between one side face of said groove and one side face of said slider, a plate disposed between said another side face of said slider and another side face of said groove, said plate and said another side face of said slider being provided with mating surfaces having a V-shape cross-section, and means for applying a pressing force to said plate in a direction substantially perpendicular to said one side face of said groove.

Therefore, the plate is pressed toward the one side face of the groove and the slider is pressed via the plate. Due to the V-shape of the mating surfaces, the vertical components of the pressing force from the plate are cancelled, and a pressing force component applied to the bottom face of the groove is reduced.

The another side face of the groove has a through hole extending toward the periphery of the cutting tool main body. A pressing member is inserted into the through hole and the end of the pressing member comes into contact with the plate so as to press the plate toward the one side face of the groove. The rear end of the pressing member comes into contact with a clamp screw threaded into the through hole. The pressing force of the pressing member onto the plate can be adjusted by the tightening depth of the clamp screw.

The through hole has an adaptor which comes into contact with the end of the clamp screw and adjusts the tightening depth of the clamp screw. An excessive pressing force applied to the slider due to the over-tightened clamp screw can be prevented.

Further, It is preferable that a pair of V-shaped inclined faces of the mating surfaces have a tilt angle in a range of 1 degree to 45 degrees in relation to a vertical line. If the tilt angle is smaller than the specified range, a larger pressing force must be applied to the plate because the effective pressing force applied to the slider is reduced. On the other hand, a tilt angle higher than the specified range increases the sizes of the surfaces and the widths of the slide and the plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
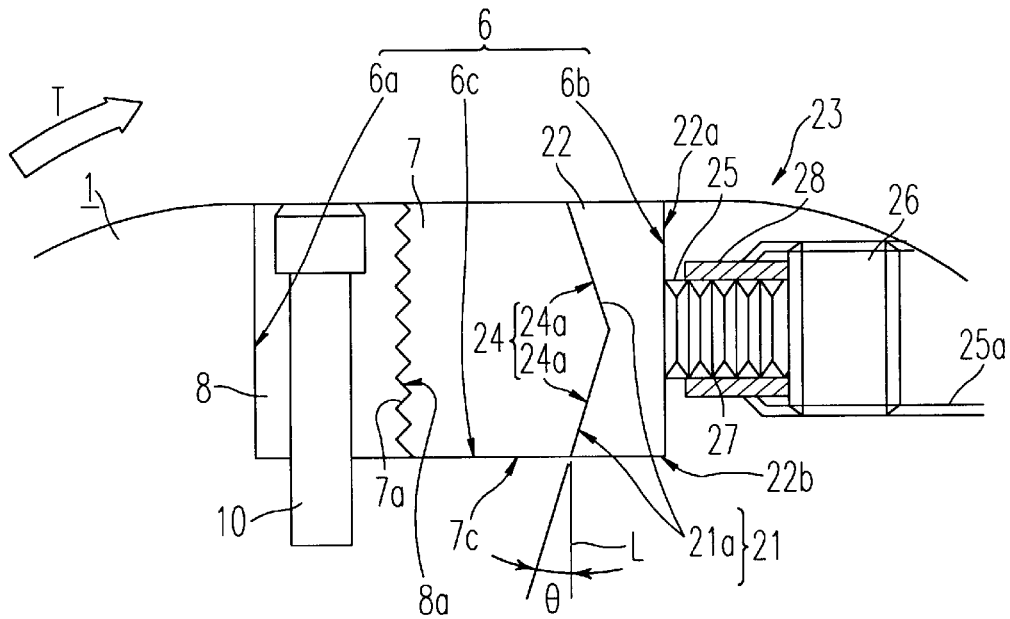
FIG. 1 is a cross-sectional view of an embodiment in accordance with the present invention, which corresponds to a cross-sectional view along a Z—Z line in FIG. 2.
Figure 2:
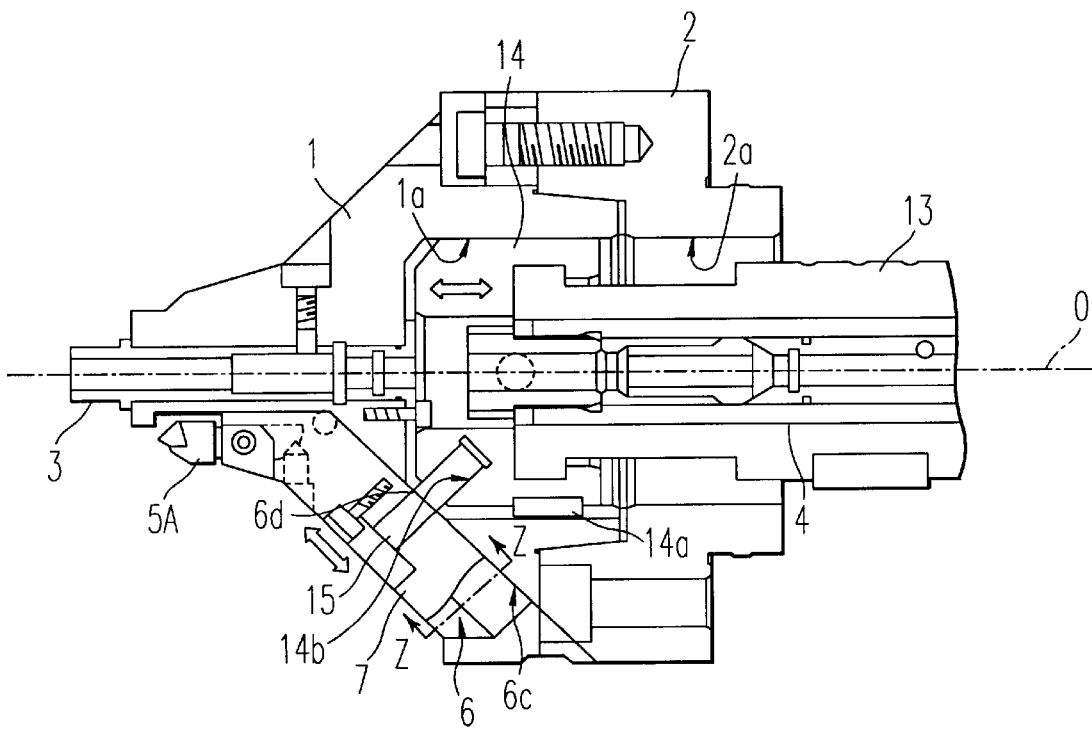
FIG. 2 is a cross-sectional view of a conventional cutting tool.
Figure 3:
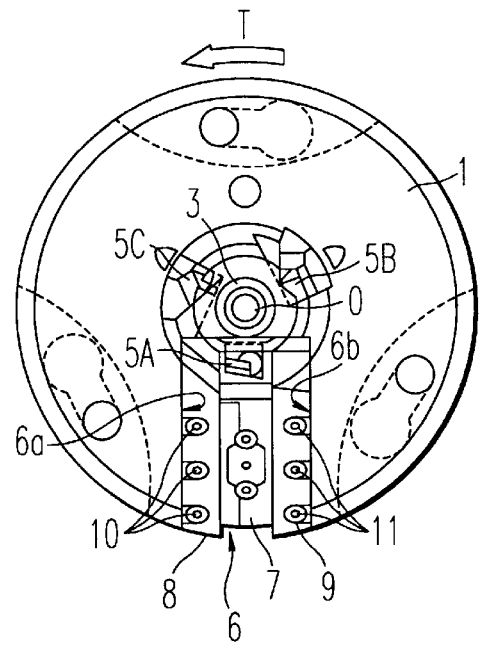
FIG. 3 is a front view of the cutting tool shown in FIG. 2.
Figure 4:
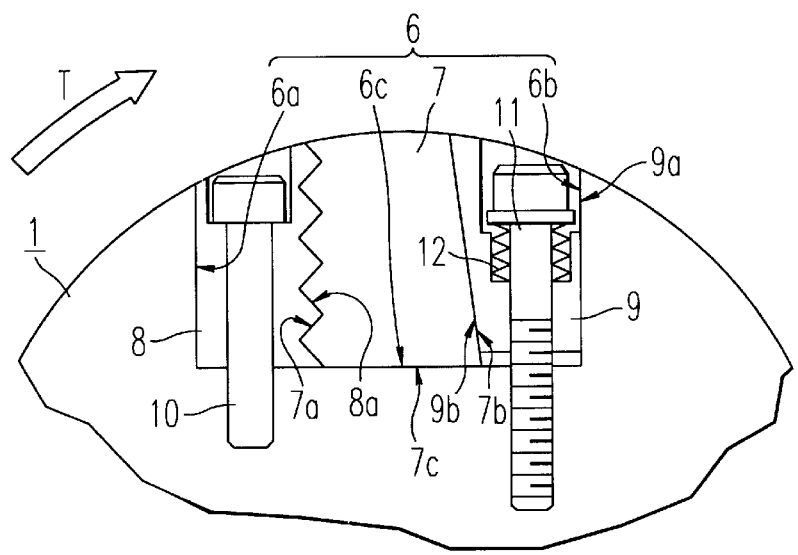
FIG. 4 is a cross-sectional view along the Z—Z line in FIG. 2.
Figure 5:
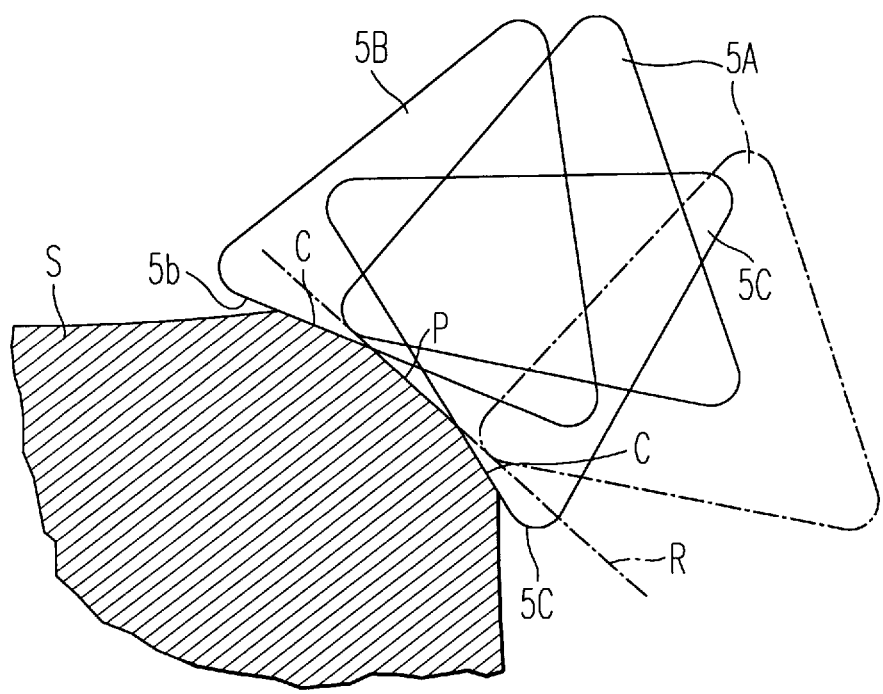
FIG. 5 is a schematic view illustrating a rotation locus along the axis O of cutting-blade chips 5A, 5B and 5C of the cutting tool shown in FIG. 1.

Referring now to the drawings, wherein like reference numerals designate identical or corresponding parts throughout the several views, and more particularly to FIG. 1 thereof which shows an embodiment of the present invention, this embodiment has the basic configuration as that of the conventional cutting tool shown in FIGS. 2 to 5, and parts having the same function as in these figures are referred to with the same identification numbers without repeated description.

FIG. 1 is a cross-sectional view in the transverse direction of the groove 6 in accordance with the present invention. The slider 7 has a symmetrical protruding side face 21 having a V-shape cross-section which is located near the side face 6b of the groove. The protruding side face 21 faces a plate 22 which is disposed between the slider 7 and the side face 6b of the groove 6. The plate 22 has a symmetrical dent section 24 having a V-shape cross-section which is pressed toward the side face 6a of the groove 6 and engages the protruding side face 21 of the slider 7. A spacer 8 is disposed between the side face 6a of the groove 6 and the slider 7. The slider 7 and the spacer 8 engage each other via their serration grooves 7a and 8a, as in the conventional cutting tool.

The protruding side face 21 has a pair of inclined faces 21a whose protruding center is located at the exact vertical center of the slider 7. Thus, the slider 7 has a maximum width at the exact vertical center and a minimum width at the top and the bottom in FIG. 1. The tilt angle θ of the two inclined faces 21a to a vertical line L, which is perpendicular to the bottom face 7c of the slider 7, ranges from 1 degree to 45°. Thus, the crossed axes angle between the two inclined faces 21a is in a range of 178° to 90°.

The plate 22 is provided along the entire length of the groove 6 as in the spacer 8, and the side face 22a and the bottom face 22b of the plate 22 come into contact with the side face 6b and the bottom face 6c of the groove 6, respectively.

The symmetrical V-shape dent section 24 of the plate 22 consists of a pair of inclined faces 24a. The dent center is located at the exact vertical center of the plate 22 so that the protruding center coincides with the dent center and the tilt angle of the two inclined faces 24a agrees with the tilt angle θ of the inclined faces 21a.

A pressing means 23 for pressing the plate 22 includes a through hole 25 extending perpendicularly from the side face 6b of the groove 6 to the periphery of the cutting tool main body 1. A female screw section 25a of the through hole 25 is formed at the periphery side of the main body 1. A disc-shaped clamp screw 26 is threaded into the female screw section 25a and closes the through hole 25, and a cone disc spring group 27, as a pressing member, is compressed between the clamp screw 26 and the side face 22a of the plate 22. The end of the compressed cone disc spring group 27 comes into contact with the side face 22a of the plate 22 and always presses the plate 22 with a given force toward the side face 6a of the groove 6.

The outer section of the through hole 25 has a larger diameter than the inner section, and a cylindrical adaptor 28 is fitted to the outer section. The cone disc spring group 27 is inserted into the adaptor 28. The clamp screw 26 comes into contact with the adaptor 28 to determine the maximum tightening depth thereof.

In the cutting tool having such a configuration, a force applied by the pressing means 23 to the slider 7 is divided into two vertical components along the vertical line L by means of the inclined mating faces 21a and 24a. Since these vertical components have the same force and the opposite directions, they cancel each other, and a vertical force pressing the slider 7 to the bottom face 6c of the groove 6 does not occur.

Accordingly, a horizontal pressing force toward the side face 6a permits a secure engaging between the serration grooves 7a and 8a and prevents backlash of the slider 7. Further, abrasion of the bottom face 7c of the slider 7 and the bottom face 6c of the groove 6 due to a pressing force applied to the bottom face 6c is suppressed, and uneven abrasion of the serration grooves 7a and 8a is prevented. The backlash of the slider 7 due to such abrasion also can be prevented. Thus, the cutting tool enables high accuracy cutting with reduced maintenance for long term operation due to prolonged lives of individual parts.

In the pressing means 23 for pressing the plate 22, when the cone disc spring group 27 is inserted into the through hole 25 provided with the side face 6b of the groove 6, the end of the cone disc spring group 27 comes into contact with the side face 22a of the plate 22, and the rear end of the cone disc spring group 27 comes into contact with the clamp screw 26 which is screwed into the female screw section 25a of the through hole 25. The pressing force applied to the plate 22 through the cone disc spring group 27 can be easily adjusted by the clamp screw 26 and so the pressing force applied to the spacer 8 through the slider 7 can be adequately adjusted. Thus, abrasion of serration grooves 7a and 8a due to an excessive pressing force and backlash due to a weak pressing force can be prevented.

In addition, the adaptor 28, which comes into contact with the end of the clamp screw 26 and adjusts the tightening depth of the clamp screw 26, can securely prevent an excessive force applied to the plate 22. Thus, the adaptor more effectively suppresses abrasion of the serration grooves 7a and 8a and permits long life of the slider 7 and the spacer 8 and smooth sliding of the slider 7 which is adequately pressed by the spacer 8.

Since the maximum tightening depth of the clamp 26 depends on the length of the adopter 28, an optimum tightening depth of the clamp 26 can be easily determined by changing the length of the adopter 28 in view of abrasion of the serration grooves 7a and 8a and the pressing force of the cone disc spring group 27.

The slider 7, the spacer 8 and the plate 22 can be easily exchanged by removing only the clamp bolt 10 for fixing the spacer 8.

Since the slider 7 engages with the spacer 8 through the serration grooves 7a and 8a, and the slider 7 engages the plate 22 through the protruding section 21 and the dent section 22, no backlash or wandering of the slider 7 and the plate 22 during cutting operation will occur, resulting in stable cutting operation.

The tilt angle θ of the paired inclined faces 21a or 24a of the protruding section 21 or the dent section 24 to the vertical line L is in a range of 1 degree to 45 degrees. An appropriate height of the protruding section 21 or an appropriate tightening depth of the dent section 21 can be achieved within this tilt angle range, and increases in sizes (in the horizontal direction in FIG. 1) of the slider 7 and the plate 22 can be prevented. If the tilt angle θ is smaller than the abovementioned range, the slider 7 cannot be stably held, due to decreased contact areas between the inclined faces 21a and 24a.

In this embodiment, the protruding section 21 is formed on a side face of the slider 7 and the dent section 24 is formed on a side face of the plate 22. Alternatively, the protruding section may be formed on a side face of the plate 22 and the dent section may be formed on a side face of the slider 7. A coil spring or the like having a desirable impressing force may be used as an pressing member instead of the cone disc spring group 27. A plurality of pressing means may be provided along the groove 6, i.e., along the generating line of the cone formed by the cutting tool main body 1, in order to uniformly press the entire slider 7 through the plate 22.

In accordance with the present invention, since the plate which is pressed toward one side face of the groove is disposed between the slider and another face of the groove, and the V-shaped protruding section formed on one side face of the plate engages the V-shaped dent section formed on another side face of the slider, the serration groove of the slider is securely engaged with the serration groove of the spacer by the pressing force from the slider, and the pressing force applied to the slider in the bottom face direction is suppressed. Thus, abrasion of the bottom faces of the slider and the groove and uneven abrasion of the serration grooves can be prevented, individual parts can be used for longer time periods, and backlash of the slider and the like due to abrasion can be prevented, resulting in high accuracy cutting.

Obviously, numerous modifications and variations of the present invention are possible in light of the above teachings. It is therefore to be understood that the invention may be practiced otherwise than as specifically described herein.

What is claimed as new and is desired to be secured by Letters Patent of the United States is:

1. A cutting tool comprising:
   a conical main body rotating along an axis and having a groove formed in a peripheral surface of the cone;
   a slider having a cutting-blade chip and slidably mounted in said groove;
   a spacer mounted between one side face of said groove and one side face of said slider;
   a plate disposed between said another side face of said slider and another side face of said groove, said plate and said another side face of said slider being provided with mating surfaces having a V-shape cross-section; and
   means for applying a pressing force to said plate in a direction substantially perpendicular to said one side face of said groove.

2. A cutting tool according to claim 1, wherein said means for applying a pressing force comprises:
   a through hole provided in said another side face of said groove and extending toward the periphery of said cutting tool main body;
   a pressing member inserted into said through hole, an end of said pressing member coming into contact with a side face of said plate so as to press the plate toward said one side face of said groove; and
   a clamp screw threaded into said through hole and engaging said pressing member.

3. A cutting tool according to claim 2, including an adaptor in said adaptor which comes into contact with an end of said clamp screw and adjusts a tightening depth of said clamp screw.

4. A cutting tool according to claim 1, wherein said mating surfaces having a V-shape cross-section have a tilt angle in a range of 1 degree to 45 degrees in relation to a vertical line.

5. A cutting tool according to claim 1, wherein said mating surfaces having a V-shape cross-section define a protruding section on said slider and a dent section on said plate.

* * * * *